United States Patent [19]

Schemmann et al.

[11] Patent Number: 4,760,297
[45] Date of Patent: Jul. 26, 1988

[54] SMALL APPLIANCE DRIVEN BY UNIDIRECTIONAL SINGLE-PHASE SYNCHRONOUS MOTOR

[75] Inventors: Hugo Schemmann, Schaesberg, Netherlands; Peter E. Steiner, Klagenfurt, Austria

[73] Assignee: U.S. Philips Corporation, New York, N.Y.

[21] Appl. No.: 33,125

[22] Filed: Mar. 31, 1987

[30] Foreign Application Priority Data

Mar. 29, 1986 [DE] Fed. Rep. of Germany ....... 3610772

[51] Int. Cl.⁴ .......................... H02K 5/24; F16F 15/12
[52] U.S. Cl. ..................................... 310/47; 30/43.92; 74/5 R; 310/41; 310/51
[58] Field of Search ..................... 30/43.92, 45; 74/53, 74/54; 310/47, 49, 41, 50, 51

[56] References Cited

U.S. PATENT DOCUMENTS

| | | | |
|---|---|---|---|
| 4,236,426 | 12/1980 | Meinke et al. | 310/51 |
| 4,313,823 | 2/1982 | Locker | 310/51 |
| 4,606,121 | 8/1986 | Diefenbach et al. | 30/43.92 |
| 4,656,376 | 4/1987 | Hyldal | 310/41 |

FOREIGN PATENT DOCUMENTS 0045107 2/1982 European Pat. Off. .......... 30/43.92

Primary Examiner—Patrick R. Salce
Assistant Examiner—D. L. Rebsch
Attorney, Agent, or Firm—F. Brice Faller

[57] ABSTRACT

A small domestic appliance is driven by means of a single-phase synchronous motor (2) whose drive shaft (5) drives a load (9), the work function being independent of the direction of rotation of the motor and the operating noise and vibrations produced by the motor being dependent on the direction of rotation of the motor. In the transmisson system a unidirectional blocking device (41) forces the rotor to start in the optimum direction of rotation. In particular, the single-phase synchronous motor (2) including its transmission path to the load (9) is constructed that the optimum operating noise is obtained in that direction of rotation in which the torque exerted on the rotor (3) by the stator current becomes zero before the magnetic detent torque has become zero, when the stator coils (4d) are not energized. This has led to a stable rest position.

10 Claims, 3 Drawing Sheets

SMALL APPLIANCE DRIVEN BY UNIDIRECTIONAL SINGLE-PHASE SYNCHRONOUS MOTOR

BACKGROUND OF THE INVENTION

The invention relates to a small domestic appliance driven by means of a single-phase synchronous motor, whose drive shaft drives a load whose work function is not dependent on the direction of rotation, the noise and vibrations produced by the motor being dependent on the direction of rotation of the motor.

Small domestic appliances whose work function is not dependent upon the direction of rotation of the motor are known. Such appliances include all appliances whose working movement is a reciprocating movement, as for example electric shavers with reciprocating cutters or hair trimmers. These reciprocating movements of the cutter means can be obtained by means of an oscillating armature motor or by means of an electric motor with a revolving armature, for example a single-phase synchronous motor. Such a drive for a hair-cutting appliance is described in, for example, the magazine ETZ, Vol. 30, 1978, H2, pages 56 to 60.

Also known are other small domestic appliances, for example citrus-juice extractors or knife sharpeners, which perform a rotary working movement and in which the tools perform their work functions independently of the direction of rotation. Moreover, it is known to drive such small domestic appliances with rotary tools by means of single-phase synchronous motors.

In small domestic appliances driven by means of single-phase synchronous motors, the dependence of the operating noise on the direction of rotation of the motor may be perceptible to a smaller or greater extent. In some cases only the pitch of the noise differs. However, there are also cases in which the noise in one direction of rotation is substantially louder and more unpleasant than in the other direction. This may disturb or annoy the user, inducing him to a negative opinion, or even complete rejection of the appliance.

The difference in noise may be caused by a motor characteristic which is dependent on the direction of rotation. Allowance is to be made in particular for asymmetries in the conversion of rotary movements into oscillating movements.

SUMMARY OF THE INVENTION

It is the object of the invention to ensure that the noise produced by appliances which are driven by single-phase synchronous motors and whose work functions are independent of the direction of rotation of the motor is not annoying and always gives the same impression even in the case of repeated switching-on and use of the appliance.

A unidirectional blocking device is arranged in the transmission path, and forces the rotor to rotate in the direction which is optimum in view of operating noise and/or vibrations. The motor always starts in this direction, so that the user always receives the same impression of the noise and the overall performance.

The single-phase synchronous motor, including its transmission path to the load, can be constructed in such a way that the optimum operating noise is obtained in that direction of rotation in which the torque exerted on the rotor by the stator current becomes equal to zero before the magnetic detent torque has become zero when the stator coils are not energized and the rotor is in a stable rest position. The rotor is forced to rotate in this positive direction by means of a mechanical unidirectional blocking device.

By providing this preferred direction of rotation and blocking the opposite direction of rotation a more acceptable operating noise can be obtained, particularly in comparison with the vibrations and noises produced by an oscillating-armature drive. Moreover, the starting noise is improved.

Mechanical unidirectional blocking devices are known per se, for example from GB-PS No. 419,767. In this known unidirectional blocking device a frictionally coupled blocking lever which is pivotally mounted on the housing experiences a radial excursion which depends on the direction of rotation of the motor, causing the lever to abut against or to be urged away from a blocking projection. In principle, such a construction can be used for blocking the undesired direction of rotation. However, on account of the direct blocking method, this cannot yield an improvement in starting noise if the motor tends to start in the undesired direction of rotation.

If the transmission elements are arranged between the drive shaft of the motor and the load, the blocking action of the unidirectional blocking device can be exerted on one of the transmission elements. The unidirectional blocking device then has a gentler blocking action and produces less noise.

The transmission elements can be constituted by a a cam mounted on the rotor shaft and a rotatably journalled follower wheel which cooperates with and is resiliently pressed against the cam, the blocking action being exerted on the follower wheel by blocking one direction of rotation of this follower wheel. In another embodiment of the invention the blocking action is exerted on one of the follower wheels. The follower wheel on which the blocking action is exerted then constitutes an element in the chain of transmission elements, but on account of its rotation it does not transmit forces to the driving member. Its rotation merely ensures that the cam smoothly cooperates with the cam follower or pivotal arm. As a result of this, the blocking action of the unidirectional blocking device is exerted outside the actual power transmission path and therefore the device acts gently on the single-phase synchronous motor by increased friction and not by direct blocking.

The blocking action can be produced by means of a resilient blocking element which is pressed against an axial surface of the follower wheel, which is provided with a blocking surface against which the blocking element abuts in the undesired direction of rotation. The blocking element is an injection molded plastic part which is arranged on the same transmission element as the follower wheel.

DETAILED DESCRIPTION OF THE INVENTION

Figure 1:
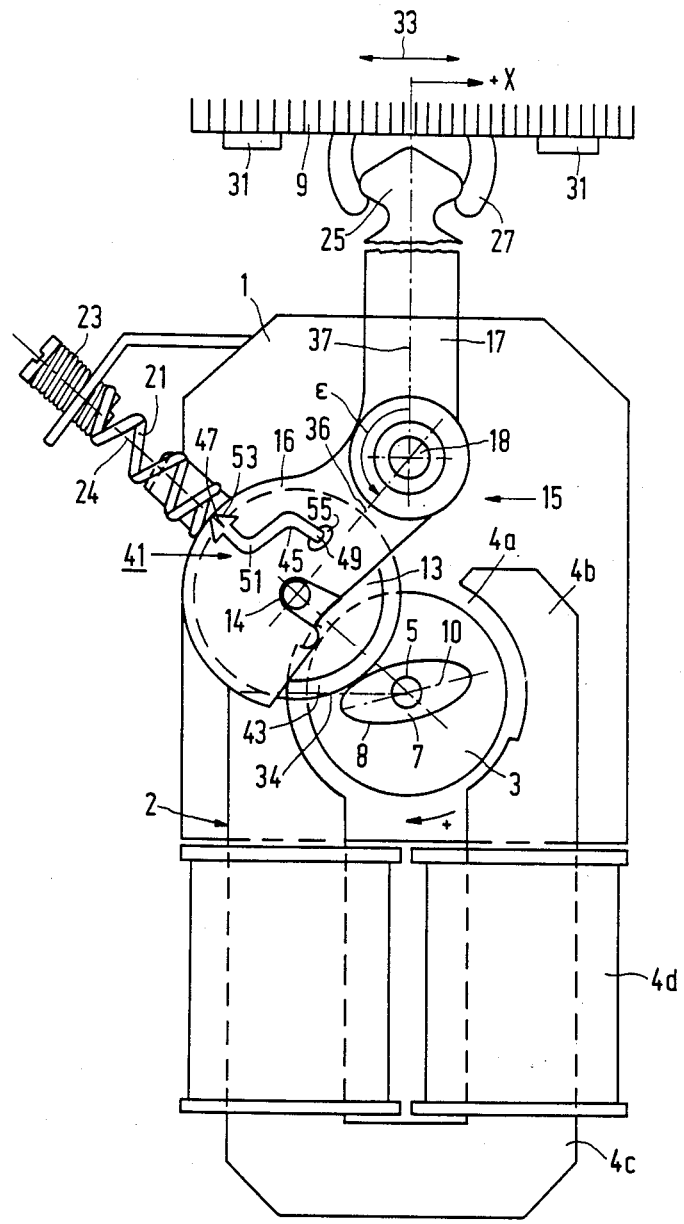
FIG. 1 is a plan view of the the drive mechanism of a dry-shaver.

FIG. 1 shows a two-arm cam-and-follower drive mechanism for a vibratory appliance, for example a dry-shaver, comprising a roller which follows a cam. A synchronous motor 2 having a permanent-magnet rotor 3 is mounted on a mounting wall 1 of the dry-shaver. The rotor 3 is mounted for rotation in the air gap 4a between the polepieces 4b. The exciter coils 4d are arranged on the U-shaped stator iron 4c with the polepieces 4b. A drive shaft 5 of the synchronous motor projects perpendicularly from the rotor 3 and points upwards with respect to the plane of the drawing. The drive shaft 5 carries a mirror-symmetrical cam 7 having such a circumferential surface 8 that a cutter 9 of the dry-shaver experiences a sinusoidal excursion which is dependent upon the angle of rotation of the cam 7 as this cam is rotated. The major axis of the cam 7 bears the reference numeral 10.

A follower wheel 13 journalled in a roller bearing 14 of a two-arm cam follower 15 is pressed against the cam 7. The cam follower 15 comprises two lever arms 16 and 17 which are pivotable about a common pivot 18 at the junction of the two lever arms 16 and 17. The lever arms 16 and 17, which are rigidly connected to each other, extend at an angle of approximately 140° to each other, which angle is measured between the line 36 interconnecting the roller bearing 14 and the pivot 18 and the central axis 37 of the lever arm 17.

A compression spring 25, whose initial pressure is adjustable by means of a set screw 23, presses against the lever arm 16. The center axis 24 of the compression spring 21 extends through the center of the motor shaft 5 in the center position of the cam-follower 15 and extends perpendicularly to the line 36 interconnecting the pivot 18 and the roller bearing 14.

The lever arm 17 of the two-arm cam-follower 15 is provided with a driving portion 25 which engages with gripping means 27 of the cutter 9. With the aid of guide means 31 the cutter 9 is movable in the directions indicated by the double arrow 33. The follower wheel 13 is pressed against the surface 8 of the cam 7 via an elastic ring 34 having a surface 43. The pressure is dimensioned in such a way that the wheel 13 cannot become disengaged from the cam 7 and the pressure cannot become so high that it affects the rotation of the rotor.

Such an arrangement comprising a single-phase synchronous motor followed by a load-transmission path generally has noise and vibration characteristics which depend on the direction of rotation of the motor. This is attributable to asymmetries in the construction of the stator pole arcs of the single-phase synchronous motor and to asymmetries with respect to the direction of rotation in the mechanical transmission path between the motor and the load.

If the noise characteristics of the single-phase synchronous motor and the following load-transmission path are optimum in the positive direction of rotation of the rotor 3, steps must be taken to ensure that the motor actually runs in this positive direction of rotation providing the optimum noise characteristics. The positive direction of rotation is that direction in which the torque exerted on the rotor by the stator current becomes zero before the magnetic detent torque has become zero when the stator coils are not energized, and at the same time has led to a stable rest position. The magnetic detent torque is the torque which opposes a rotation of the rotor magnet when the stator coils are not energized. In the stable rest position, when the stator coils are not energized, the rotor occupies a specific position relative to the stator poles 4b as a result of the magnetic force exerted by the rotor magnet, which position deviates from the principal direction of the stator field by a positive angle.

Figure 2:
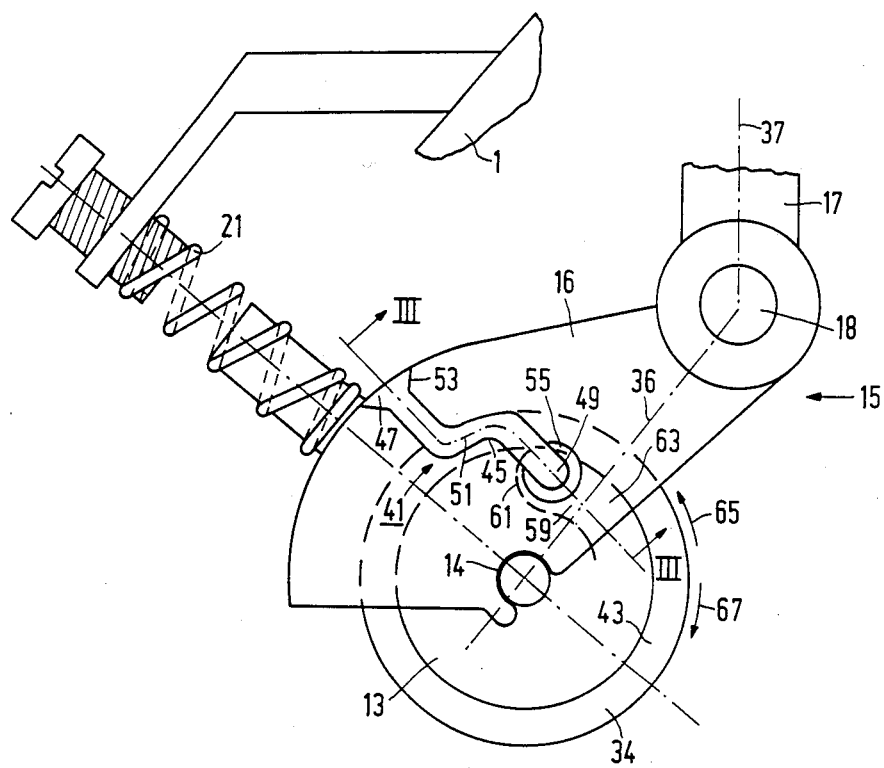
FIG. 2 is a plan view showing the cam follower and a unidirectional blocking device which acts on the follower wheel.
Figure 3:
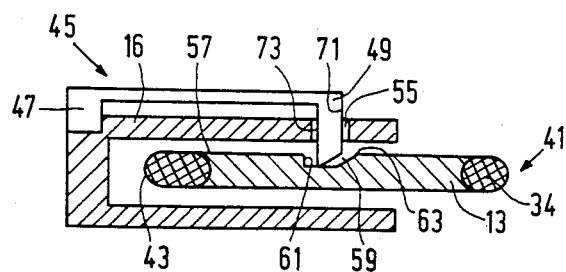
FIG. 3 is a sectional view of the arrangement taken on the line III—III in FIG. 2.

A mechanical unidirectional blocking device 41 ensures that the optimum direction of rotation is obtained, which device is shown only schematically in FIG. 1, is shown in plan view in FIG. 2 and is shown in FIG. 3 in a sectional view taken on the line III—III. This unidirectional blocking device 41 acts between the lever arm 16 of the two-arm cam-follower 15 and the follower wheel 13 whose circumferential surface is provided with a friction ring 43, for example a rubber ring. The unidirectional blocking device 41 comprises a blocking element 45 comprising a mounting pin 47, a blocking hook 49 and a resilient Z-shaped bridge 51 which interconnects the mounting pin 47 and the blocking hook 49. The mounting pin 47 is captively mounted in a dovetail recess 53 in the lever arm 16. The blocking hook 49 extends freely through a hole 55 in the lever arm 16. The resilient bridge 51 constantly urges the blocking hook 49 against a axial surface 57 of the follower wheel 13 (FIG. 3).

In the surface 57 of the cam follower wheel 13 a recess 59 is formed. This recess 59 has two differently shaped circumferential walls 61 and 63. The wall 61 constitutes a blocking wall for the blocking hook 49 and therefore extends perpendicularly to the radial surface 57. The other wall 63 is inclined, allowing the blocking hook 49 to slide over this wall. This unidirectional blocking device is operative depending on the direction of rotation of the motor. If the rotor 3 rotates the follower wheel 13 via the cam 7 in the direction indicated by an arrow 65 the blocking hook 49 continually runs out of the recess 59 via the inclined wall 63. If the cam 7 rotates the follower wheel 13 in the direction indicated by the arrow 67 the blocking hook 49 abuts against the blocking wall 61, thereby blocking the follower wheel 13. If the friction between the surface 43 of the friction ring 34 on the wheel 13 and the cam 7 is high enough the follower wheel 13 stalls the rotor 3. This means that the direction of rotation of the single-phase synchronous motor is reversed. The elastic construction of the friction ring, which merely constitutes a transmission aid and not a transmission element, also ensures that blocking impulses are damped and the system is mechanically relieved. The deformation of the surface of the friction ring 34 results in a quasi-direct blocking, which after a delay acts gently by friction. The blocking action of the blocking element 41 is selected in such a way that the rotor 3 can start only in the optimum direction of rotation, i.e. the direction of rotation in which the noise characteristics are more favorable. In this way it is ensured that the motor and the drive mechanism operate only in the optimum direction of rotation, said direction of rotation being the direction in which the noise transmitted to the load-transmission path 7, 13, 16, 17, 27, 9 is least annoying and minimal. Preferably, the rear wall 71 of the blocking hook 49 can abut elastically against the wall 73 of the hole 55. The spring constant and mass of the blocking element 41 should be such that, during operation of the device, vibrations are minimal and the blocking hook most gently engages with the follower wheel 13. A resilient Z-shaped bridge 51 in the form of a plastics part is very suitable for this purpose. Moreover, the pressure exerted by the spring must be dimensioned in such a way that the motor operation is stabilized and additional damping means for the motor may be dispensed with. The desired pressure can be obtained when the lever is elastic and is under a specific initial load.

Figure 4:
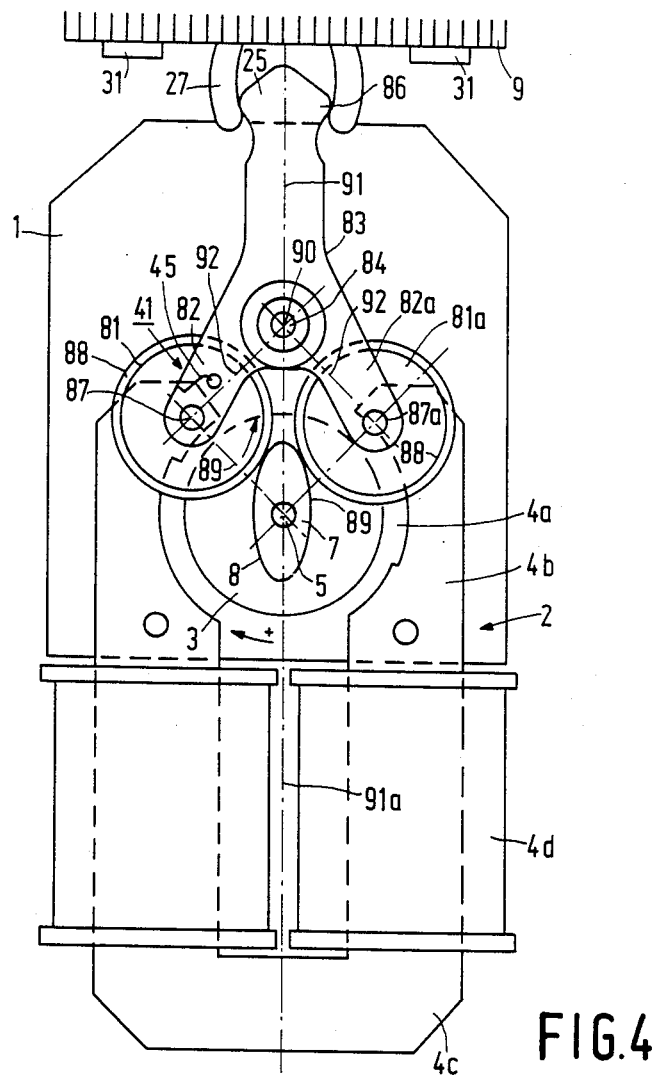
FIG. 4 shows a modified drive mechanism comprising a cam and two cam-follower rollers.

In the embodiment shown in FIG. 4 it is not necessary to exert pressure on a roller by means of a spring. The rotor shaft 5 of the single-phase synchronous motor 2 drives two cam-follower rollers 81, 81a via the mirror-symmetrical cam 7, said rollers being arranged on the free ends of the arms 82, 82a of a pivotal arm 83. The pivotal arm 83 is mounted on the frame 1 so as to be pivotable about an axis 83. The cam-follower rollers 86 and 81a follow the circumferential surface 8 of the cam 7 with which they are constantly in engagement. The gripping means 27 of the cutter 9 engage with the driving end portion 86 of the arm 83. The two arms or only one of the arms 82 and 82a may be elastic in a manner not shown. Alternatively, the pivots for the roller spindles 87 and 87a may be elastic or the circumferential surface of one or both rollers 81, 81a may be provided with an elastic lining 88 to provide same compensation so as to preclude jamming.

In the embodiment shown in FIG. 4 the lines 89 interconnecting the motor/cam axis 5 and the roller axes 87, 87a enclose an angle $\alpha_0$ which is 90° in the centre position shown. As the movement which is pressed on the rollers 81, 81a by the cam 7 and which originally starts from the center position of the rollers 81, 81a is based on a linearly oscillating movement in the direction of the line 89 interconnecting the cam and roller axes, the center 90 of the spindle 84 of the pivotal arm 83 is suitably the centre of a circle which is substantially tangent to the two roller spindles 87, 87a in the center position of the rollers 81, 81a. This circular path should be situated as close as possible to the linearly oscillating roller path. For this purpose it is advantageous if the axis 84 of the pivotal arm or the central axis 91a of the motor lamination constitutes the bisector of the line 89 interconnecting the roller axes 87, 87a and the cam axis 5, said central axis 91a extending through the cam axis 5. In the center position of the pivotal arm 83 the lines 92 interconnecting the pivotal arm axis 84 and the roller axes 87, 87a and the line 89 interconnecting the cam axis 5 and the roller axes 87, 87a suitably extend perpendicularly to one another. Deviations from the linear path lead to deformations. It is possible to allow and compensate for these deviations in designing the cam profile. Another possibility of obtaining a concurrent and uniform engagement of the rollers with the cam is to ensure that departures from the ideal linear path are equal in the positive and the negative direction. Tolerances and residual noise can be reduced by rollers which are fully elastic or only on their circumferential surfaces. In this respect it is advantageous if one or both driving arms 82, 82a are elastic, in such a way that they exert only a gentle pressure on the cam 7.

The transmission path of the appliance includes a unidirectional blocking device 41 corresponding to that shown in FIGS. 2 and 3. In FIG. 4 this unidirectional blocking device 41 is shown at the location of the arm 82.

Figure 5:
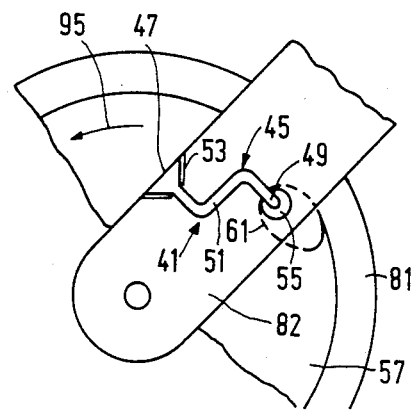
FIG. 5 shows the unidirectional blocking device of FIGS. 2 and 3 used in the mechanism of FIG. 4.

FIG. 5 shows the unidirectional blocking device 41 in more detail. The device 41 acts between the arm 82 and the follower wheel 81; it comprises an injection-molded plastic blocking element 45 comprising a mounting pin 47, a blocking hook 49 and a Z-shaped bridge 51 connecting these parts. The mounting pin 47 is captively mounted in a dovetail recess 53 in the arm 82. The blocking hook 49 extends through a hole 55 in the arm 52 so as to be freely movable. The resilient bridge 51 urges the blocking hook 49 constantly against the axial surface 57 of the follower wheel 81.

The radial surface 57 of the follower wheel is formed with a recess 59 which in the desired direction of rotation terminates at the surface 57 via an inclined surface 63 and which has a blocking surface 61 in the opposite direction of rotation.

When the cam 7 rotates the wheel 81 in the desired direction of rotation (arrow 95) the unidirectional blocking device 51 is inoperative. When the cam 7 rotates the wheel 81 in a direction opposite to the desired direction of rotation (95), the blocking hook 49 abuts against the blocking surface 61 and is retained. As a result of this, the direction of rotation of the motor is reversed.

What is claimed is:

1. A small domestic appliance driven by a rotor of a single-phase synchronous motor (2) whose drive shaft (5) via a transmission path drives a load (9) whose work function is not dependent on the direction of rotation, the noise and vibrations produced by the motor being dependent on the direction of rotation of the motor, characterized in that a mechanical unidirectional blocking device (41) is arranged in the transmission path, which device forces the rotor to rotate in the direction which is optimum in view of operating noise and/or vibrations, said motor including resilient blocking means in its transmission path to the load said resilient blocking means being arranged so that the optimum operating noise is obtained in that direction of rotation in which the torque exerted on the rotor (3) by the stator current becomes zero before the magnetic detent torque has become zero when the stator coils (4d) are not energized and the rotor is in a stable rest position, the rotor being forced to rotate in this direction by said unidirectional blocking device.

2. A domestic appliance as claimed in claim 1, in which transmission elements (7, 13, 15) are arranged between the drive shaft (5) of the motor (2) and the load (9), characterized in that the blocking action of the unidirectional blocking device (41) is exerted on one of said transmission elements.

3. A domestic appliance as in claim 2, in which the transmission elements are constituted by a cam-and-follower mechanism (7, 13, 15) comprising a cam (7) mounted on the rotor shaft (5) and a rotatably journalled follower wheel (13) which cooperates with and is resiliently pressed against the cam (7), characterized in that the blocking action is exerted on said follower wheel (13), causing the single-phase synchronous motor (2) to be blocked indirectly.

4. A domestic appliance as in claim 2, in which the transmission elements are constituted by a cam-and-follower mechanism (7, 81, 81a, 83) comprising a cam (7) mounted on the rotor shaft (5) and rotatably journalled follower wheels (81, 81a) which cooperate with the cam (7), characterized in that the blocking action is exerted on one of the follower wheels (81, 81a).

5. A domestic appliance as in claim 4, characterized in that the blocking action is produced by means of a resilient blocking element (45) which is pressed against an axial surface (57) of the follower wheel (13, 81, 81a)

which is provided with a blocking surface (61) against which the blocking element (45) abuts in the undesired direction of rotation.

6. A domestic appliance as claimed in claim 5, characterized in that the blocking element (45) is a Z-shaped injection molded plastic part which is arranged on the same transmission element (16 or 82) as the follower wheel (13 and 81, 81a respectively).

7. A domestic appliance as claimed in claim 5, characterized in that the blocking element (45) is provided with a plastic blade spring (51) which urges a blocking hook (49) against the axial surface (57) of the follower wheel (13, 81, 81a).

8. A domestic appliance as in claim 3, characterized in that the blocking action is produced by means of a resilient blocking element (45) which is pressed against an axial surface (57) of the follower wheel (13, 81, 81a) which is provided with a blocking surface (61) against which the blocking element (45) abuts in the undesired direction of rotation.

9. A domestic appliance as claimed in claim 8, characterized in that the blocking element (45) is a Z-shaped injection molded plastic part which is arranged on the same transmission element (16 or 82) as the follower wheel (13 and 81, 81a respectively).

10. A domestic appliance as claimed in claim 8, characterized in that the blocking element (45) is provided with a plastic blade spring (51) which urges a blocking hook (49) against the axial surface (57) of the follower wheel (13, 81, 81a).

* * * * *